US009007591B2

(12) United States Patent
Arimoto et al.

(10) Patent No.: US 9,007,591 B2
(45) Date of Patent: Apr. 14, 2015

(54) OPTICAL ANALYZER

(71) Applicant: HORIBA, Ltd., Kyoto-shi, Kyoto (JP)

(72) Inventors: Kimihiko Arimoto, Kyoto (JP); So Takagi, Kyoto (JP); Takaaki Yada, Kyoto (JP)

(73) Assignee: HORIBA, Ltd., Kyoto-shi (JP)

( * ) Notice: Subject to any disclaimer, the term of this patent is extended or adjusted under 35 U.S.C. 154(b) by 0 days.

(21) Appl. No.: 14/091,069

(22) Filed: Nov. 26, 2013

(65) Prior Publication Data

US 2014/0146317 A1     May 29, 2014

(30) Foreign Application Priority Data

Nov. 28, 2012 (JP) .................................. 2012-260394

(51) Int. Cl.
  *G01N 21/00* (2006.01)
  *G01J 9/00* (2006.01)
  *G01N 21/01* (2006.01)
  *G01J 3/02* (2006.01)

(52) U.S. Cl.
  CPC ...................................... *G01J 3/0297* (2013.01)

(58) Field of Classification Search
  None
  See application file for complete search history.

(56) References Cited

U.S. PATENT DOCUMENTS

| | | | | |
|---|---|---|---|---|
| 3,790,798 A | * | 2/1974 | Sternberg et al. | 250/345 |
| 3,950,101 A | * | 4/1976 | Dewey, Jr. | 356/51 |
| 4,371,785 A | * | 2/1983 | Pedersen | 250/343 |
| 5,445,964 A | * | 8/1995 | Lee et al. | 436/60 |
| 5,750,994 A | * | 5/1998 | Schlager | 250/339.11 |
| 6,128,080 A | * | 10/2000 | Janik et al. | 356/491 |
| 6,611,334 B1 | * | 8/2003 | Fernando et al. | 356/436 |
| 2003/0107739 A1 | * | 6/2003 | Lehmann et al. | 356/437 |
| 2005/0014271 A1 | * | 1/2005 | Davis et al. | 436/43 |
| 2005/0241948 A1 | * | 11/2005 | Han et al. | 205/108 |
| 2005/0249634 A1 | * | 11/2005 | Devlin, Sr. | 422/64 |

FOREIGN PATENT DOCUMENTS

JP     2007155494 A     6/2007

\* cited by examiner

*Primary Examiner* — Kara E Geisel
*Assistant Examiner* — Jarreas C Underwood
(74) *Attorney, Agent, or Firm* — Alleman Hall McCoy Russell & Tuttle LLP (57) ABSTRACT

The present invention includes: an optical fiber being provided either of between a light source and a measurement cell and between the measurement cell and a light detection part; and light path switching means adapted to achieve switching between a measurement cell passage state in which a light path formed by light transmission means passes through the measurement cell and a measurement cell non-passage state in which the light path formed by the light transmission means passes through a region different from the measurement cell, wherein calibration processing for a first calibration with a long calibration cycle is performed in the measurement cell passage state, and calibration processing for a second calibration with a short calibration cycle is performed in the measurement cell non-passage state.

3 Claims, 6 Drawing Sheets

(1) MEASUREMENT CELL PASSAGE STATE P (2) MEASUREMENT CELL NON-PASSAGE STATE Q

FIG. 3

(1) MEASUREMENT CELL PASSAGE STATE P (2) MEASUREMENT CELL NON-PASSAGE STATE Q

FIG. 4

(1) MEASUREMENT CELL PASSAGE STATE P (2) MEASUREMENT CELL NON-PASSAGE STATE Q

OPTICAL ANALYZER

TECHNICAL FIELD

The present invention relates to an optical analyzer.

BACKGROUND ART

Figure 6:
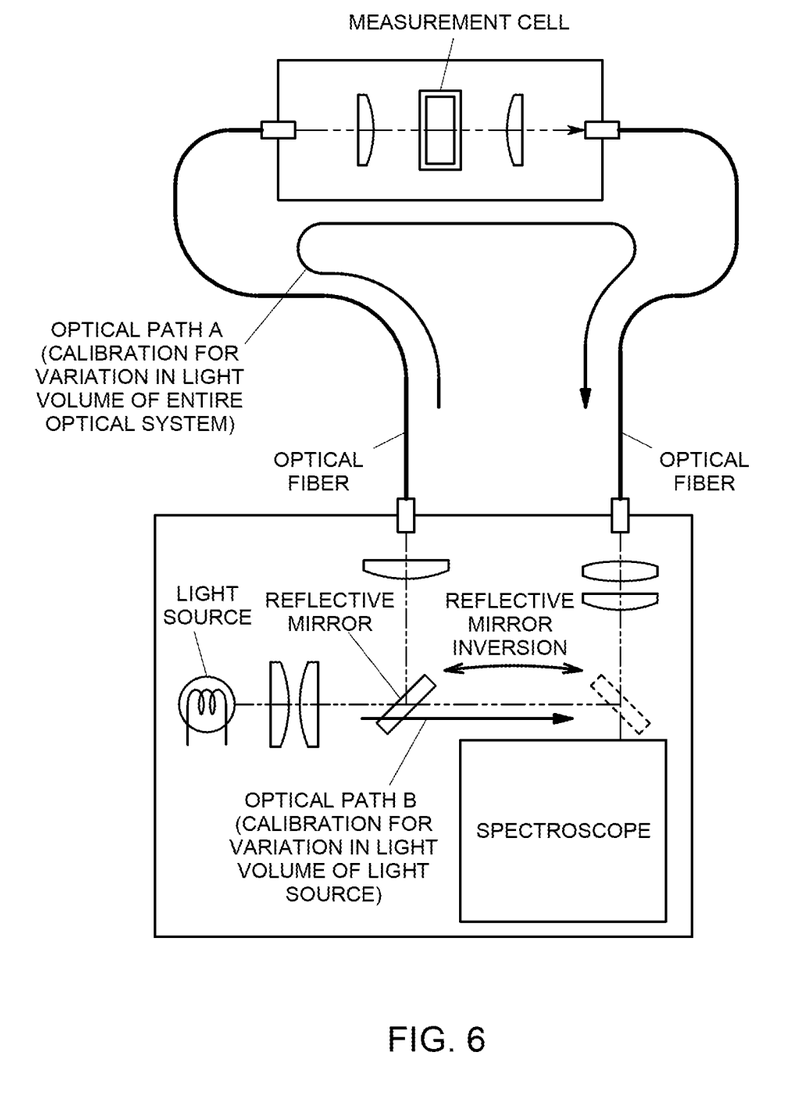
FIG. 6 is a pattern diagram showing a configuration of a conventional optical analyzer.

There is a conventional optical analyzer which guides light from a light source to a measurement cell by an optical fiber and guides the light, which has passed through the measurement cell, to a spectroscope by the optical fiber, as shown in FIG. 6. Then in this configuration, by light path switching means having a reflective mirror provided between the optical fiber, the light source, and the spectroscope, switching is performed between a light path A introducing the light from the light source to the measurement cell via the optical fiber and a light path B guiding the light from the light source to the spectroscope not via the optical fiber.

Then performed in this optical analyzer are: a light source light volume calibration in which a variation in light volume of the light source is regularly calculated with the light path B, and an optical system light volume calibration in which a calibration fluid with known absorbance is regularly poured into the measurement cell in a state of the light path A to calibrate a variation in light volume of the entire optical system including the optical fiber and the measurement cell.

Here, possible factors in the variation in light volume of the entire optical system calibrated by the aforementioned optical system light volume calibration are: a temperature change of the optical fiber, a state change such as oscillation or curvature change, and state changes such as contamination of the measurement cell and a light path length change. The inventor of this application has found that state changes of the optical fiber and a light a source are more likely to occur than the state change of the measurement cell, and a large portion of the variation in light volume of the entire optical system is attributable to the state changes of the optical fiber and the light source, and the variation in light volume caused by the state changes such as the contamination of the measurement cell and the light path length change is relatively small.

Thus, calibration processing of calibrating the variation in light volume caused by the optical fiber and the light source needs to be performed frequently, but calibration processing of calibrating the variation in light volume caused by the measurement cell does not need to be performed frequently.

However, in the aforementioned optical system light volume calibration, the variation in light volume caused by the optical fiber and the light source and the variation in light volume caused by the measurement cell are calibrated together, and a calibration fluid needs to be stored in the measurement cell in accordance with a frequency of the calibration of the variation in light volume caused by the optical fiber and the light source. This requires frequent calibration processing performed by replacing a liquid sample as contents of the measurement cell with a calibration fluid, resulting in user unfriendliness.

Moreover, there is a configuration such that calibration totally different from the calibration shown in FIG. 6 is performed, and as shown in Patent Literature 1, a sample cell and a calibration cell are arranged in parallel to each other, and an optical fiber as light transmission means is moved to thereby achieve switching between a measurement position in which the sample cell is irradiated with light and a calibration position in which the calibration cell is irradiated with light.

However, with the configuration such that the calibration cell is provided separately from the sample cell, a calibration fluid line for pouring the calibration fluid into this calibration cell is required. With the configuration such that a calibration fluid is temporarily sealed into a calibration cell, the calibration fluid deteriorates, resulting in failure to perform accurate calibration. Moreover, variation attributable to contamination of the measurement cell itself cannot be calibrated, causing a problem in that a measurement error occurs. Furthermore, the configuration in Patent Literature 1, as described above, does not perform the mutually different calibrations, but performs a single calibration in a state in which the optical fiber is at the calibration position.

CITATION LIST

Patent Literature

[Patent Literature 1] JP-A-No. 2007-155494

SUMMARY OF INVENTION

Technical Problem

Thus, it is a main object of the present invention to improve user friendliness by dividing a calibration of the variation in light volume caused by an optical fiber and a calibration of the variation in light volume caused by a measurement cell.

Solution to Problem

An optical analyzer according to the present invention includes: an optical fiber being provided either between a light source and a measurement cell or between the measurement cell and a light detector; and a light path switching means adapted to achieve switching between a measurement cell passage state in which a light path of light passing through the optical fiber passes through the measurement cell and a measurement cell non-passage state in which the light path of the light passing through the optical fiber passes through a region different from the measurement cell, wherein calibration processing for a first calibration with a long calibration cycle is performed in the measurement cell passage state, and calibration processing for a second calibration with a short calibration cycle is performed in the measurement cell non-passage state. The light path of the light passing through the optical fiber refers to a light path of light exiting the optical fiber where the optical fiber is provided between the light source and the measurement cell, and refers to a light path of light entering the optical fiber where the optical fiber is provided between the measurement cell and the light detection part.

With such an optical analyzer, the first calibration is performed with the light path of the light passing through the optical fiber in the measurement cell passage state and the second calibration is performed in the measurement cell non-passage state, and thus a calibration for a variation in light volume of an entire optical system including the measurement cell and a calibration for a variation in light volume of the optical system not including the measurement cell can be performed independently from each other. That is, the second calibration is performed in the measurement cell non-passage state, and the light passing through the fiber without passing through the measurement cell is guided to the light detection part, thus permitting a calibration for variation in light volume following state changes of the optical fiber and the light source separately from that of the measurement cell.

Moreover, calibration processing for the first calibration with the long calibration cycle in the measurement cell passage state is performed and calibration processing for the second calibration with the short calibration cycle in the measurement cell non-passage state is performed, which can therefore reduce the frequency of the first calibration for calibrating the variation in light volume following a state change of the measurement cell more than that of the second calibration for calibrating the variation in light volume following the state changes of the optical fiber and the light source. On the other hand, the state changes of the optical fiber and the light source occur in a relatively short period, and the variation in light volume caused by the optical fiber and the light source can be calibrated by the second calibration, thus permitting the calibration of the variation in light volume caused by the optical fiber and the light source in a short cycle. As described above, calibration processing for the calibration of the variation in light volume caused by the measurement cell can be performed in a long cycle and also calibration processing for the calibration of the variation in light volume caused by the optical fiber and the light source can be performed in a short cycle, which can therefore improve user friendliness.

To make the effect of the present invention remarkable, it is preferable that the first calibration is performed at least in part by pouring a calibration fluid into the measurement cell and the second calibration be performed by not pouring the calibration fluid into the measurement cell. The first calibration with the longer cycle than that of the second calibration is performed by storing the calibration fluid, and a frequency of replacing a sample as contents of the measurement cell with the calibration fluid can be reduced. That is, at a stage at which the variation in light volume caused by the measurement cell influences the measurement, the variation in light volume caused by the entire optical system including the measurement cell can be performed, thus permitting reduction in frequency of storing the calibration fluid in the measurement cell, which can therefore solve user unfriendliness.

The optical fiber causes variation in light volume due to, for example, a temperature change, oscillation, or a curvature change, and thus as a result of performing the second calibration in the measurement cell non-passage state by moving the optical fiber, the state of the optical fiber in sample measurement after the second calibration differs from a state of the optical fiber at a time of the second calibration, thereby causing variation in light volume. To solve this problem and further reduce the variation in light volume caused by the optical fiber, it is preferable that the optical fiber is fixed, and the light path switching means is adapted to move either of the measurement cell and an optical element provided between the optical fiber and the measurement cell to thereby achieve the switching between the measurement cell passage state and the measurement cell non-passage state.

Moreover, it is possible to switch between the measurement cell passage state and the measurement cell non-passage state by moving the measurement cell, but this requires movement of a pipe connected to the measurement cell, possibly causing problems such as a liquid leak from a movable part of the pipe and arrangement space. Moreover, in a case where the pipe is formed of a type having no movable part and no elasticity, the measurement cell cannot be moved. Thus, it is preferable that the light path switching means be adapted to achieve the switching between the measurement cell passage state and the measurement cell non-passage state by moving an optical component provided between the optical fiber and the measurement cell.

The optical analyzer further includes: a first optical fiber guiding light of the light source to the measurement cell; a second optical fiber being provided between the measurement cell and the light detection part and guiding the light, having passed through the measurement cell, to the light detection part; a first reflective member being provided between the first optical fiber and the measurement cell; and a second reflective member being provided between the measurement cell and the second optical fiber, wherein the first optical fiber and the second optical fiber are fixed and the first reflective member and the second reflective member are movably provided; and the light path switching means is adapted to move the first reflective member and the second reflective member to thereby achieve the switching between the measurement cell passage state and the measurement cell non-passage state. As described above, in the configuration that has the first fiber guiding light from the light source to the measurement cell and the second fiber guiding the light, having passed through the measurement cell, to the light detection part, an influence on the variation in light volume due to the state change of the optical fiber is large, but fixing these two optical fibers and moving the first reflective member and the second reflective member can make the effect of the present invention even more remarkable. Moreover, since the measurement cell is fixed, there is no need to move the pipe connected to the measurement cell and there arise no problems such as the liquid leak from the movable part of the pipe and the arrangement space.

Advantageous Effects of Invention

According to the present invention with such configuration, the calibration for the variation in light volume caused by the optical fiber and the calibration for the variation in light volume caused by the measurement cell can be separated from each other, improving user friendliness. Moreover, there is no need to separately provide a calibration cell for storing the calibration fluid, which can therefore simplify a surrounding facility accompanying it.

DESCRIPTION OF EMBODIMENTS

An optical analyzer according to the present invention will be described below with reference to the accompanying drawings.

An optical analyzer 100 of the present embodiment is built in, for example, a semiconductor manufacturing line for use, and is, for example, an absorption spectrophotometer that measures a concentration of a chemical solution used in a cleaning process in the semiconductor manufacturing line.

Used as the chemical solution are: SC-1 (aqueous ammonia and aqueous hydrogen peroxide), SC-2 (hydrochloric acid and aqueous hydrogen peroxide), SPM (sulfuric peroxide mixture), BHF (buffered hydrofluoric acid), etc.

Figure 1:
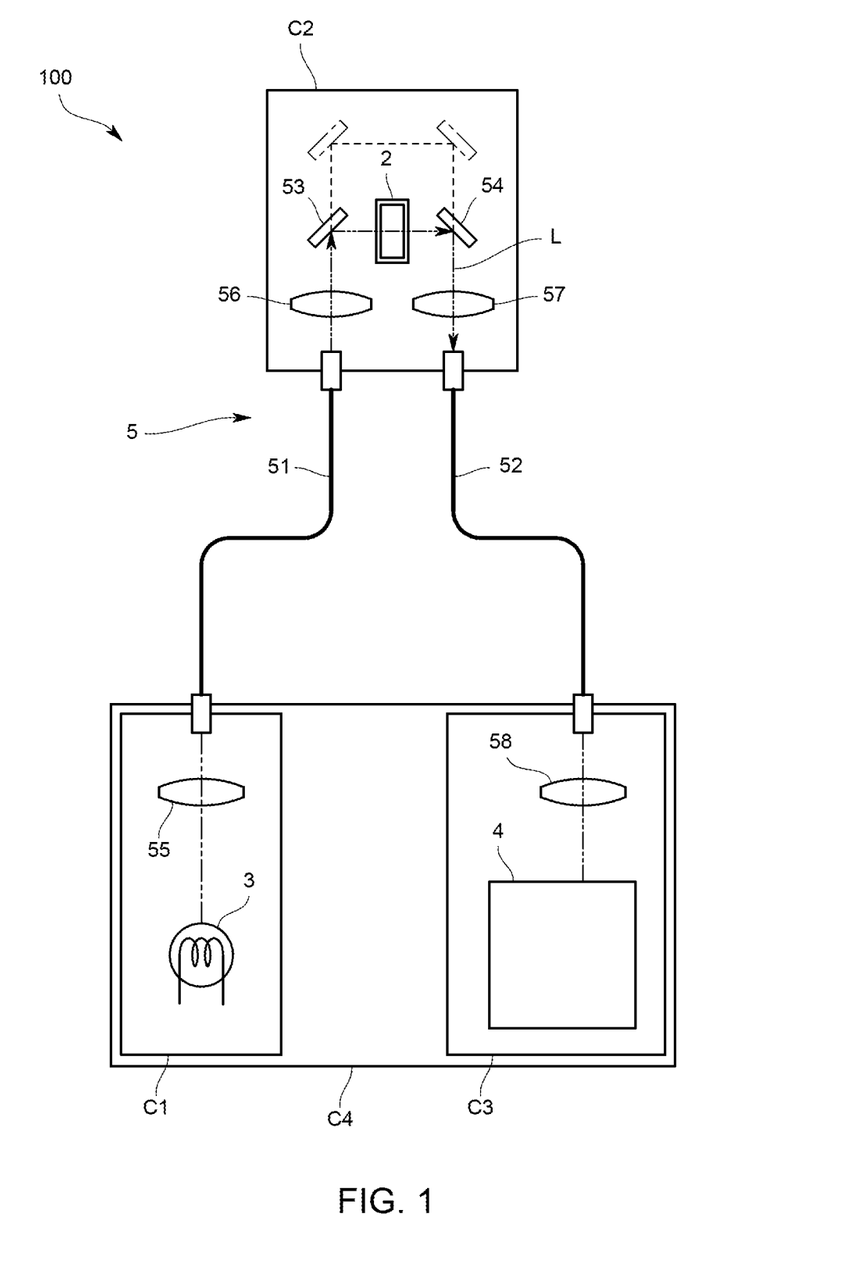
FIG. 1 is a pattern diagram showing a configuration of an optical analyzer according to an embodiment of the present invention.

More specifically, the optical analyzer 100, as shown in FIG. 1, includes: a measurement cell 2 storing a liquid sample such as a chemical solution; a light source 3, for example, a halogen lamp, for irradiating the measurement cell 2 with light; a light detection part 4 for detecting light that has passed through the measurement cell 2; and light transmission means 5 adapted to guide light from the light source 3 to the measurement cell 2 and also guide, to the light detection part 4, the light that has passed through the measurement cell 2.

The measurement cell 2 is, for example, a flow cell provided in a circulation path formed by a chemical solution pipe connected to a chemical solution tank of a semiconductor cleaner. Note that the measurement cell 2 may also be an inline flow cell directly built-in into the pipe in the semiconductor cleaner.

The light detection part 4 is a spectroscope splitting light that has passed through the measurement cell 2 and then detecting its spectral distribution (light volume for each wavelength). Spectral distribution data obtained by this light detection part 4 is outputted to an arithmetic device (not shown), and this arithmetic device calculates an absorbance spectrum of the metical solution based on the spectral distribution obtained by the light detection part 4 and a spectral distribution of a calibration fluid to be described below, and this absorbance spectrum is used to calculate concentration of a component contained in the liquid sample.

The light transmission means 5 is provided between the light source 3 and the measurement cell 2, and includes: a first optical fiber 51 guiding light of the light source 3 to the measurement cell 2; a second optical fiber 52 which is provided between the measurement cell 2 and the light detection part 4 and which guides, to the light detection part 4, the light that has passed through the measurement cell 2; a first reflective member 53 such as a reflective mirror provided between the first optical fiber 51 and the measurement cell 2; and a second reflective member 54 such as a reflective mirror provided between the measurement cell 2 and the second optical fiber 52.

Moreover, provided between a light introduction end surface of the first optical fiber 51 and the light source 3 is a condensing lens 55 for condensing light of the light source 3 onto the light introduction end surface. Provided between a light extraction end surface of the first optical fiber 51 and the first reflective member 53 is a condensing lens 56 for condensing, onto the measurement cell 2, light exiting from the light extraction end surface.

Further, provided between a light introduction end surface of the second optical fiber 52 and the second reflective member 54 is a condensing lens 57 for condensing light from the second reflective member 54 onto the light introduction end surface. Provided between a light extraction end surface of the second optical fiber 52 and the light detection part 4 is a condensing lens 58 for condensing light exiting from the light extraction end surface onto an entrance slit of the light detection part 4.

In the present embodiment, a light source storage case C1 storing the light source 3 and a measurement cell storage case C2 storing the measurement cell 2 are connected together by the first optical fiber 51, and the measurement cell storage case C2 and a light detection part storage case C3 storing the light detection part 4 are connected together by the second optical fiber 52. Here, a light introduction end part of the first optical fiber 51 (portion having the light introduction end surface) is fixed at a side wall of the light source storage case C1, and a light extraction end part (portion having the light extraction end surface) of the first optical fiber 51 is fixed at a side wall of the measurement cell storage case C2 such that the entire first optical fiber 51 is fixed. A light introduction end part (portion having the light introduction end surface) of the second optical fiber 52 is fixed at the side wall of the measurement cell storage case C2, and a light extraction end part (portion having the light extraction end surface) of the second optical fiber 52 is fixed at the light detection part storage case C3, such that the entire second optical fiber 52 is fixed. In the present embodiment, the light extraction end part of the first optical fiber 51 and the light introduction end part of the second optical fiber 52 are fixed at the same side wall in the measurement cell storage case C2. This makes it easy to perform maintenance of the measurement cell storage case C2. Furthermore, in the light source storage case C1, the condensing lens 55 is stored. Stored in the measurement cell storage case C2 are: the first reflective member 53, the second reflective member 54, and the condensing lenses 56 and 57. Stored in the light detection part storage case C3 is the condensing lens 58. The light source storage case C1 and the light detection part storage case C3 are further stored in a single casing C4, but the light source storage case C1 and the light detection part storage case C3 may be each provided as a single case. Moreover, the aforementioned cases C1 to C4 may be of the type that has a covered entire surface or the type that is separated from external space but also partially open (for example, have one open surface).

Figure 2:
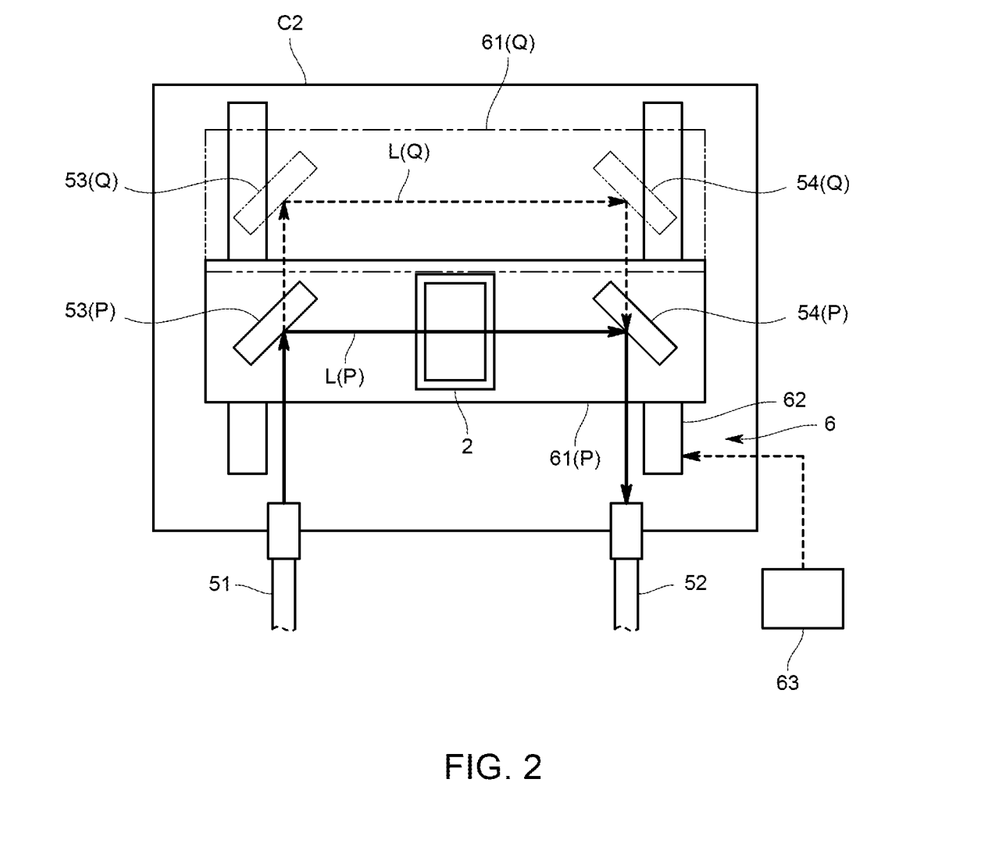
FIG. 2 is a pattern diagram showing an inner configuration of a measurement cell storage case of the present embodiment.
Figure 3:
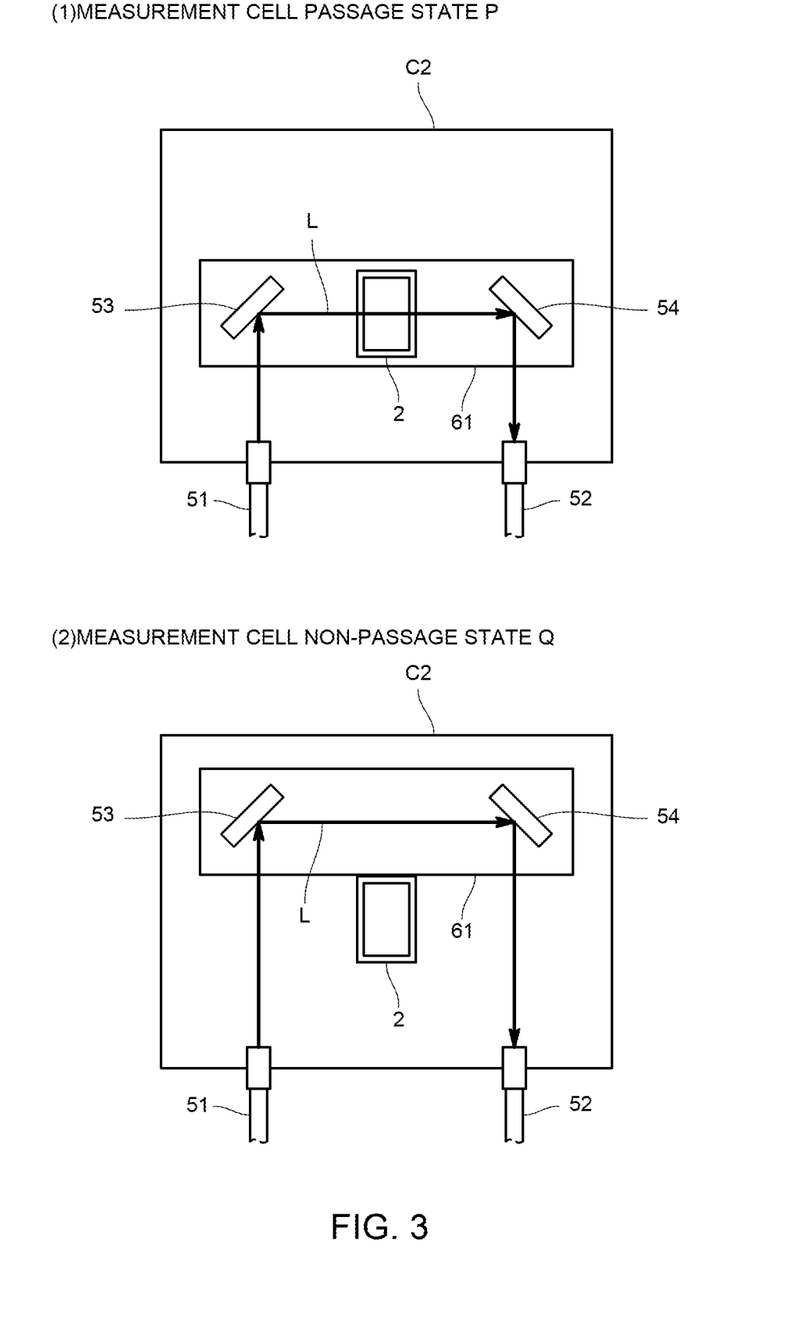
FIG. 3 is a pattern diagram showing a mode of light path switching by movement of reflective members of the present embodiment.

However, the optical analyzer 100 of the present embodiment, as shown in FIGS. 2 and 3, includes light path switching means 6 adapted to switch between a measurement cell passage state P (see FIG. 3(1)) in which a light path L formed by the light transmission means 5 passes through the measurement cell 2 and a measurement cell non-passage state Q (see FIG. 3(2)) in which the light path L formed by the light transmission means 5 passes through a region different from the measurement cell 2. Here, the light path L is a path through which light exiting from the light extraction end surface of the first optical fiber 51 passes and through which the light which has passed through the measurement cell 2 and enters the light introduction end surface of the second optical fiber 52 passes. In the measurement cell non-passage state Q, in a configuration such that there is nothing in a space between the first reflective member 53 and the second reflective member 54, the light path L between the first reflective member 53 and the second reflective member 54 permits air passage, but a calibration filter may be separately arranged so that the light path L between the first reflective member 53 and the second reflective mirror 54 passes through the calibration filter.

The light path switching means 6 is provided in the measurement cell storage case C2, and by moving the first reflective member 53 and the second reflective member 54 as optical components provided between the first optical fibers 51 and 52 and the measurement cell C2, switches between the measurement cell passage state P in which the measurement cell 2 is located between the first reflective member 53 and the second reflective member 54 and the measurement cell non-passage state Q in which the measurement cell 2 is not located between the first reflective member 53 and the second reflective member 54.

As detailed configuration of this light path switching means 6, provided are: a holding member 61 holding the first reflective member 53 and the second reflective mirror second reflective member 54; a moving mechanism 62 linearly moving the holding member 61; and a control part 63 controlling this moving mechanism 62. The holding member 61 is a single member integrally holding the first reflective member 53 and the second reflective member 54, and this single holding member 61 is moved by the moving mechanism 62 to thereby switch between the measurement cell passage state P and the measurement cell non-passage state Q without changing relative position of the first reflective member 53 and the second reflective member 54. The moving mechanism 62 includes: a guide mechanism guiding the holding member 61, and an actuator moving the holding member 61 along this guide mechanism. Since chemical solution gas is present in ambient, in terms of safety, used as the actuator here is a pneumatic actuator such as an air cylinder. The control part 63 may be formed by the arithmetic device, or may be provided separately from the arithmetic device.

In the light transmission means 5, as described above, the first reflective member 53 and the second reflective member 54 are so configured as to be movable, and the first optical fiber 51 and the second optical fiber 52 are fixed in a manner such as not to move during the switching between the measurement cell passage state P and the measurement cell non-passage state Q. The other components forming the light transmission means 5, that is, the condensing lenses 55 to 58 are also fixed so as not to move during the switching between the measurement cell passage state P and the measurement cell non-passage state Q. That is, only by the movement of the first reflective member 53 and the second reflective member 54, the switching between the measurement cell passage state P and the measurement cell non-passage state Q is performed.

Next, calibration operation of the optical analyzer 100 configured as described above will be described.

The optical analyzer 100 of the present embodiment performs calibration processing for a first calibration with a long calibration cycle in the measurement cell passage state P, and performs calibration processing for a second calibration with a short calibration cycle in the measurement cell non-passage state Q. Hereinafter, a detailed description will be given.

In a case where the measurement cell passage state P is provided by the light path switching means 6, the chemical solution from the chemical solution tank flows normally and a concentration measurement of the chemical solution is performed.

Then to perform the first calibration in this measurement cell passage state P, the chemical solution flowing to the measurement cell 2 is stopped and a calibration fluid (for example, pure water such as deionized water) with known absorbance is poured into the measurement cell 2. A semiconductor manufacturing device such as a semiconductor cleaner in the semiconductor manufacturing line uses pure water for cleaning a pipe of the device at a time when maintenance is performed, for example, every half year, and this pure water is possibly used as the calibration fluid. A light volume at this point (initial calibration fluid light volume) is measured by the light detection part 4. Moreover, in this first calibration, providing the measurement cell non-passage state Q by the light path switching means 6, a light volume at this point (first reference light volume) is measured by the light detection part 4.

The arithmetic device, based on the light volumes obtained in the aforementioned two states P and Q, calculates an absorbance as Abs (calibration fluid)=log ("first reference light volume"/"initial calibration fluid light volume"), and the absorbance Abs (calibration fluid) is defined as a calibration reference value.

This calibration reference value is set every time the first calibration is performed, and until the next performance of the first calibration, the calibration reference value is not changed. Moreover, absorbance for the side wall of the cell is subjected to a correction calculation with previously obtained data as a parameter.

After end of the first calibration, the arithmetic device calculates an absorbance as Abs of the chemical solution (sample)=log ("initial calibration fluid light volume"/"sample light volume") based on a light volume (sample light volume) measured in a normal chemical solution measurement and the initial calibration fluid light volume. Based on the absorbance Abs (sample) obtained in this manner, the arithmetic device calculates the concentration of the chemical solution.

On the other hand, the second calibration is performed regularly during the normal chemical solution measurement after the first calibration ends. To perform the second calibration, the measurement cell non-passage state Q is provided by the light path switching means 6, and a light volume at this point (second reference light volume) is measured by the light detection part 4. Note that at this point, the chemical solution continues to be stored in the measurement cell 2.

The arithmetic device calculates a calibration fluid light volume (hereinafter, referred to as arithmetic calibration fluid light volume) by using the aforementioned calibration reference value and the second reference light volume obtained in the measurement cell non-passage state Q. The calibration reference value used in the second calibration is obtained by the latest first calibration.

More specifically, the arithmetic device calculates the "arithmetic calibration fluid light volume" based on log ("first reference light volume"/"initial calibration fluid light volume")=log ("second reference light volume"/"arithmetic calibration fluid light volume"), where the calibration reference value is constant.

Then the arithmetic device replaces the "initial calibration fluid light volume" of the absorbance Abs (sample)=log ("initial calibration fluid light volume"/"sample light volume") with the "arithmetic calibration fluid light volume". This replacement with the "arithmetic calibration fluid light volume" is performed every time the second calibration is performed.

After the second calibration ends, based on the light volume (sample light volume) measured in the normal chemical solution measurement and the arithmetic calibration fluid light volume, the arithmetic device calculates the absorbance Abs (sample) of the chemical solution=log ("arithmetic calibration fluid light volume"/"sample light volume"). Based on the absorbance Abs (sample) obtained in this manner, the arithmetic device calculates the concentration of the chemical solution.

Specifically, the optical analyzer 100 of the present embodiment, in the first calibration with the long calibration cycle, measures the initial calibration light volume and also calculates the calibration reference value, and in the second calibration with the short calibration cycle, measures the second reference light volume and also calculates the arithmetic calibration fluid light volume based on the second reference light volume and the calibration reference value.

The first calibration performed by pouring the calibration fluid into the measurement cell 2 is targeted to calibrate the variation in the light volume caused by a state change of the measurement cell 2, and since the state of the measurement cell 2 (contamination, cell length) does not drastically change, the calibration cycle of the first calibration is longer than that of the second calibration. The calibration cycle of the first calibration is, for example, approximately once every year or half year. Moreover, the components contributing to the variation in light volume calibrated by the first calibration are: the light source 3, the first optical fiber 51, the measurement cell 2, the calibration fluid, the second optical fiber 52, etc.

On the other hand, the second calibration performed without pouring the calibration fluid into the measurement cell 2 is targeted to calibrate the variation in light volume caused by state changes of the light source 3, the first optical fiber 51, and the second optical fiber 52, and since states of the optical fibers 51 and 52 change in a relatively short period, the second calibration is performed in the calibration cycle that is shorter than that of the first calibration. The calibration cycle of this second calibration is, for example, once every 10 minutes. Moreover, the components contributing to the variation in light volume calibrated by the second calibration are: the light source 3, the first optical fiber 51, the second optical fiber 52, air, etc.

With the optical analyzer 100 according to the present embodiment configured as described above, the first calibration is performed where the light path L formed by the light transmission means 5 having the first optical fiber 51 and the second optical fiber 52 is in the measurement cell passage state P, and the second calibration is performed where the light path L is in the measurement cell non-passage state Q, and thus a calibration of variation in light volume of an entire optical system including the measurement cell 2 and a calibration of variation in light volume of the optical system not including the measurement cell 2 can be performed independently from each other. That is, the second calibration is performed in the measurement cell non-passage state Q and the light transmitted by the first optical fiber 51 and the second optical fiber 52 without passing it through the measurement cell 2 is guided to the light detection part 4, and thus the variation in light volume following the state changes of the first optical fibers 51 and 52 can be performed separately from that for the measurement cell 2.

Moreover, since calibration processing for the first calibration with the long calibration cycle is performed in the measurement cell passage state P and the calibration processing for the second calibration with the short calibration cycle is performed in the measurement cell non-passage state Q, the frequency of the first calibration calibrating the variation in light volume following the state change of the measurement cell 2 can be reduced compared to that of the second calibration calibrating the variation in light volume following the state changes of the optical fibers 51 and 52. On the other hand, while the state changes of the optical fibers 51 and 52 occur in a relatively short period, the variation in light volume caused by these optical fibers 51 and 52 can be calibrated by the second calibration using no calibration fluid, thus making it possible to calibrate the variation in light volume caused by the optical fibers 51 and 52 in a short cycle. The calibration processing for calibrating the variation in light volume caused by the measurement cell 2 can be performed in the long cycle and the calibration processing for calibrating the variation in light volume caused by the optical fibers 51 and 52 can be performed in the short cycle, thus making it possible to improve user friendliness.

The present invention is not limited to the embodiment described above.

Figure 4:
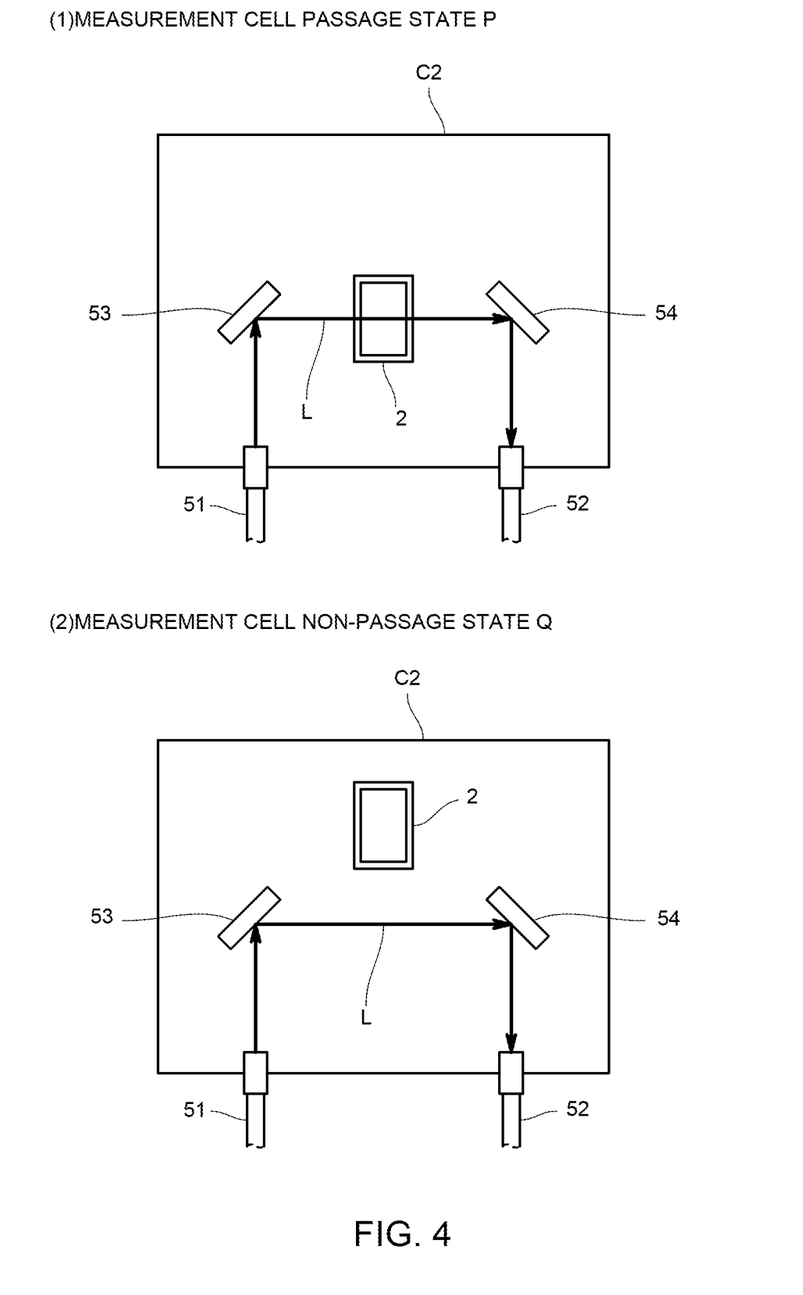
FIG. 4 is a pattern diagram showing a mode of light path switching by movement of a measurement cell according to a modified example.

For example, the light path switching means 6 switches between the measurement cell passage state P and the measurement cell non-passage state Q by moving the first reflective member 53 and the second reflective member 54, but as shown in FIG. 4, without moving the first reflective member 53 and the second reflective member 54, the measurement cell 2 may be moved. Moreover, the first reflective member 53 and the second reflective member 54 and the measurement cell 2 may be moved with respect to each other. Configuration as shown in FIG. 4 is possible if the pipe connected to the measurement cell 2 has flexibility but if the pipe has no flexibility, a problem arises, and thus it is desirable to provide the configuration as in the embodiment.

Figure 5:
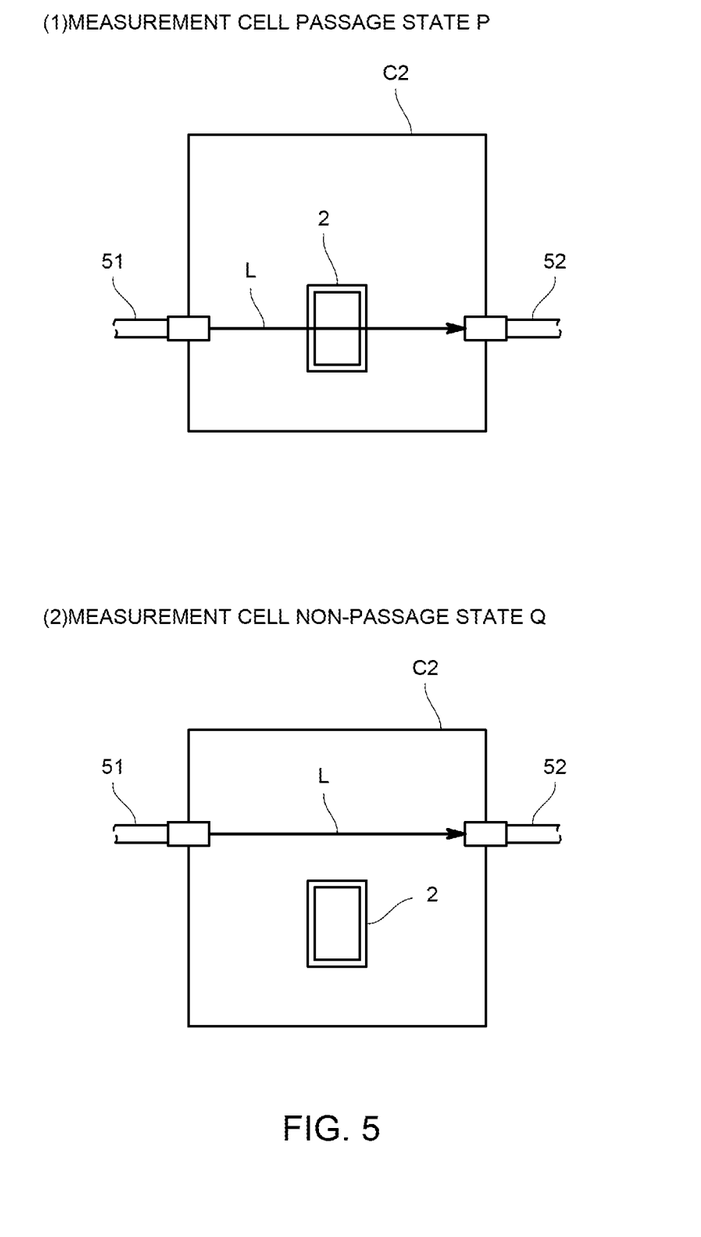
FIG. 5 is a pattern diagram showing a mode of light path switching by movement of an optical fiber according to a modified example.

Moreover, as shown in FIG. 5, in the configuration which irradiates the measurement cell 2 with light from the first optical fiber 51 not via the first reflective member 53 and the second reflective member 54 and then introduces the light, which has passed through the measurement cell 2, to the second optical fiber 52, the light extraction end surface of the first optical fiber 51 and the light introduction end surface of the second optical fiber 52 may be moved with respect to the measurement cell 2 to thereby achieve switching between the measurement cell passage state P and the measurement cell non-passage state Q. In a case where a condensing lens (not shown in FIG. 5) is provided between the light extraction end surface of the first optical fiber 51 and the measurement cell 2 and a condensing lens (not shown in FIG. 5) is provided between the light introduction end surface of the second optical fiber 52 and the measurement cell 2, these condensing lenses are also moved together with the optical fibers 51 and 52. In the configuration shown in FIG. 5, without moving the first optical fiber 51 and the second optical fiber 52, the measurement cell 2 may be moved. Moreover, both the first optical fiber 51 and the second optical fiber 52 and the measurement cell 2 may be moved relative to each other.

Further, the light transmission means 5 of the aforementioned embodiment has the first optical fiber 51 and the second optical fiber 52, but may have only either one of them. Near the surroundings of the measurement cell 2, chemical solution gas is present, or there may be a limited installation space, which makes it difficult to arrange the light source 3 and the light detection part 4. Thus, it is desirable that, by using both the first optical fiber 51 and the second optical fiber 52, the light source 3 and the light detection part 4 be arranged at a position away from the measurement cell 2.

Furthermore, it is preferable that a rear surface reflective mirror be used as the first reflective member 53 and the second reflective member 54 of the aforementioned embodiment. Use of a front surface reflective mirror raises a problem in that a reflective surface (for example, a front surface of a metal film such as an aluminum film) is corroded by corrosive gas leaking from the cell. On the other hand, as a result of using the rear surface reflective mirror, the reflective surface is protected by a glass substrate, which can prevent the corrosion of the reflective surface. It is possible to prevent corrosion of the reflective film by covering the reflective film of the front surface reflective mirror with, for example, a glass plate, but it causes interference by an air layer between the reflective film and the glass plate, deteriorating the light volume. Moreover, it is possible to prevent the corrosion of the reflective film by storing the front surface reflective mirror in, for example, a glass container, but this complicates a structure of the reflective member, which results in not only upsizing but also deterioration in the light volume as a result of absorption of the light by the glass container.

Other aspects of the present invention are not limited to the aforementioned embodiment, and it is needless to say that various alterations may be made within a range not departing from the spirit of the present invention.

REFERENCE CHARACTER LIST

100 Optical analyzer
2 Measurement cell
3 Light source

4 Light detection part
5 Light transmission means
L Light path
51 First optical fiber
52 Second optical fiber
53 First reflective member
54 Second reflective member
6 Light path switching means
P Measurement cell passage state
Q Measurement cell non-passage state

The invention claimed is:

1. An optical analyzer comprising:
an optical fiber being provided either between a light source and a measurement cell or between the measurement cell and a light detector; and
a light path switching means adapted to achieve switching between a measurement cell passage state in which a light path of light passing through the optical fiber passes through the measurement cell and a measurement cell non-passage state in which the light path of the light passing through the optical fiber passes through a region different from the measurement cell, wherein
calibration processing for a first calibration with a long calibration cycle is performed in the measurement cell passage state, and calibration processing for a second calibration with a short calibration cycle is performed in the measurement cell non-passage, wherein
the first calibration is performed by pouring a calibration fluid into the measurement cell; and
the second calibration is performed without pouring the calibration fluid into the measurement cell.

2. The optical analyzer according to claim 1, wherein
the optical fiber is fixed; and
the light path switching means is adapted to move either of the measurement cell and an optical element provided between the optical fiber and the measurement cell to thereby achieve the switching between the measurement cell passage state and the measurement cell non-passage state.

3. An optical analyzer comprising:
an optical fiber being provided either of between a light source and a measurement cell and between the measurement cell and a light detector; and
light path switching means adapted to achieve switching between a measurement cell passage state in which a light path of light passing through the optical fiber passes through the measurement cell and a measurement cell non-passage state in which the light path of the light passing through the optical fiber passes through a region different from the measurement cell, wherein
calibration processing for a first calibration with a long calibration cycle is performed in the measurement cell passage state, and calibration processing for a second calibration with a short calibration cycle is performed in the measurement cell non-passage state, and the optical analyzer comprising:
a first optical fiber guiding light of the light source to the measurement cell; a second optical fiber being provided between the measurement cell and the light detection part and guiding the light, having passed through the measurement cell, to the light detection part; a first reflective member being provided between the first optical fiber and the measurement cell; and a second reflective member being provided between the measurement cell and the second optical fiber, wherein
the first optical fiber and the second optical fiber are fixed and the first reflective member and the second reflective member are movably provided; and
the light path switching means is adapted to linearly move the first reflective member and the second reflective member to thereby achieve the switching between the measurement cell passage state and the measurement cell non-passage state.

* * * * *